Feb. 28, 1961    N. MARCUS ET AL    2,972,932
INFRARED TRANSMITTING ACHROMATIC LENS SYSTEM
Filed Oct. 17, 1955
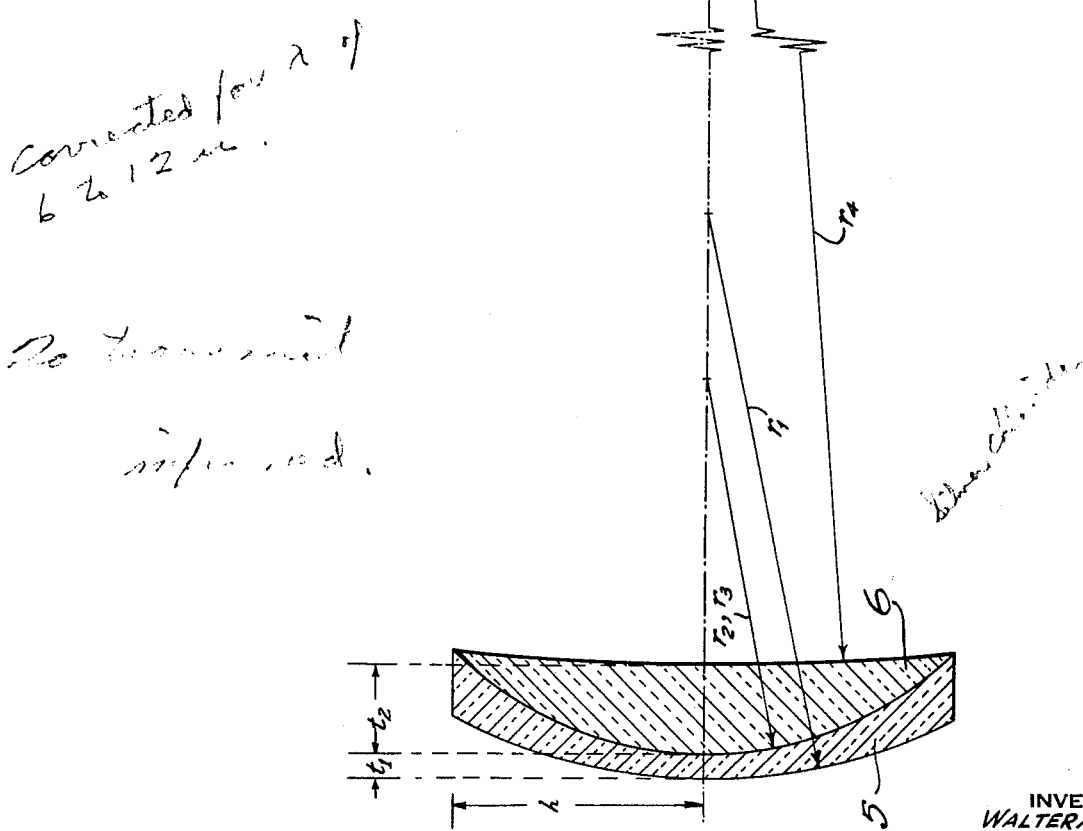
INVENTORS
WALTER A. FRASER
NORMAN MARCUS
BY
ATTORNEYS

United States Patent Office 2,972,932
Patented Feb. 28, 1961

2,972,932

INFRARED TRANSMITTING ACHROMATIC LENS SYSTEM

Norman Marcus, Franklin Square, N.Y., and Walter A. Fraser, Crozet, Va., assignors to Servo Corporation of America, New Hyde Park, N.Y., a corporation of New York Filed Oct. 17, 1955, Ser. No. 542,943

3 Claims. (Cl. 88—57)

Our invention relates to a lens configuration and in particular to a multiple-element lens having special utility in the infrared region.

It is an object of the invention to provide an improved lens of the character indicated.

It is another object to provide a lens configuration having relatively minor aberrations in the infrared region.

It is a specific object to achieve a substantially achromatic lens in the wavelength region from substantially six to twelve microns.

It is a further specific object to provide a substantially achromatic multiple-element infrared lens in which at least the outer exposed element may be rugged enough to withstand abuse and atmospheric erosion, thus providing extended useful life for the lens.

Other objects and various further features of novelty and invention will be pointed out or will become apparent to those skilled in the art from a reading of the following specification in conjunction with the accompanying drawing. Said drawing is a sectional view on the optical axis of a lens incorporating features of the invention.

Briefly stated, the invention contemplates a fast-lens construction featuring substantial achromatism in the infrared region extending to substantially twelve microns wavelength. This result is achieved in a doublet employing two different infrared-transmitting materials for the negative and positive elements thereof. The two materials used have substantially different V-values, and because the indices of refraction are high, wide relative aperture is feasible without excessive curvature.

In the specific case illustrated, we have provided a contact-doublet lens having a negative element or component 5 adjacent a positive element or component 6. As the negative element, we have employed arsenic trisulfide glass, being of a family of glasses formed as the heat-reaction product of arsenic with one or more elements from the group including sulfur, selenium and tellurium, as more fully disclosed in copending patent applications, Serial No. 372,540, filed August 5, 1953 (abandoned in favor of continuation-in-part application Serial No. 644,690, now U.S. Patent No. 2,883,291), and Serial No. 417,724, filed March 22, 1954 (abandoned in favor of continuation-in-part application Serial No. 668,563, now U.S. Patent No. 2,883,294). Assuming the infrared band of 8 to 11 microns as of specific interest, the V-value of glasses of this family, and in particular that of arsenic trisulfide, is given as:

$$V = \frac{N_8 - N_{11}}{N_{9.5} - 1}$$

wherein $N_8$ and $N_{11}$ are the respective indices for the limits of the assumed band, and $N_{9.5}$ is the index for the center of the band. Under these circumstances, the V-value of the glass is about 69.1.

In order to achieve chromatic correction in the combination of elements 5—6, it is desirable that the V-value of the other material be substantially different from that for the described glass, for the same infrared band. We have found that in this respect silver chloride serves adequately, in that its V-value is about 76.1. Since the V-value of the silver chloride exceeds that for the arsenic-compounded glass, we prefer that the arsenic compound be used in the negative element 5, while the material of higher V-value (silver chloride) be in the positive element 6.

Now, in spite of the above-noted difference in V-values, which is useful for chromatic correction for rays on and near the optical axis, it is a property of these lenses that, for any given focal length, the required total curvature in each component 5—6 varies inversely as the difference in V-values. This difference is not as substantial as might be available for the design of lenses for visual-light optics. Thus, even for the higher indices of refraction available with the materials indicated, the relatively large curvatures that result (for any given focal length) are the source of undesirably excessive spherical aberration and coma. For example, the greatest relative aperture that can be obtained with a $As_2S_3$—AgCl doublet is approximately $f/4.5$ if complete achromatism is to be maintained.

We have found that achromatic properties may be compromised slightly with our infrared doublet and that a highly desirable fast lens can be thereby attained. This may be done by ascribing a small residual chromatic aberration to the system, and by thereafter varying the total curvature of each element and solving for the minimum spherical aberration. Assuming a focal length of approximately 400 mm., the following relationships may be obtained to suggest a first approximation of a design:

| Curvature of Element 5 ($As_2S_3$) | Curvature of Element 6 (AgCl) | Minimum point of Spherical Aberration Curve (mm.) | Curvature of Contact Surface |
|---|---|---|---|
| −0.001 | 0.00395 | 11.46 | 0.0045 |
| −0.0015 | 0.00465 | 7.40 | 0.0051 |
| −0.002 | 0.00536 | 7.06 | 0.0058 |
| −0.0025 | 0.00606 | 1.38 | 0.0065 |
| −0.003 | 0.00676 | −8.00 | 0.007 |
| −0.004 | 0.00817 | −34.36 | 0.009 |

The coma for each of the above-noted curvatures of the contact surfaces is substantially zero. Further, it will be noted that there is also a point at which spherical aberration is substantially zero, but since chromatic aberration is now the limiting factor, there is no need to find the point of zero spherical aberration.

We have found that a fast lens doublet (relative aperture $f/2$) of approximately 400 mm. focal length may be obtained using dimensions in the drawing as follows:

| $r_1 = 222$ mm. | $t_1 = 10$ mm. |
|---|---|
| $r_2 = r_3 = 143$ mm. | $t_2 = 35$ mm. |
| $r_4 = 1000$ mm. | $h = 100$ mm. |

Under these circumstances, the various aberrations develop as follows:

| Type of Aberration | Nature | Circle of Confusion | |
|---|---|---|---|
| | | Circle Diameter (mm.) | Angular (degrees) |
| Chromatic | On-axis | 0.845 | 0.124 |
| Spherical | On-axis | 0.297 | 0.044 |
| Coma | 15° off-axis | 0.378 | 0.056 |

If this design is considered for a speed of $f/1$, the spherical aberration and coma become approximately four times as large, but chromatism remains unchanged since it is independent of aperture. We have investigated other lenses of these general proportions and for shorter focal lengths (down to 100 mm.), and as a result feel that the pratical upper limit for relative aperture is of the order of $f/1.5$; at this opening, both chromatism and spherical aberration are approximately 0.2°, while coma is considerably less.

It will be seen that we have described a lens configuration having excellent properties in the infrared region of substantially 6 to 12 microns. The system lends itself to relatively wide apertures, without affecting the small residual chromatic aberration; also, the total field may be relatively wide without affecting chromatism. The system is particularly useful for airborne and other weather-exposed applications in that the rugged negative component 5 of arsenic-compounded glass may be the outwardly facing element, thereby protecting the silver chloride element 6 against deterioration, and providing long useful service.

While we have described the invention in detail in connection with a specific embodiment, it will be understood that modifications may be made within the scope of the invention as defined in the claims which follow.

We claim:

1. An infrared-transmitting achromatic lens, comprising a positive silver chloride element having opposite faces of radii $r_3$ and $r_4$, and a negative vitreous non-crystalline arsenic trisulfide element having opposite faces of radii $r_1$ and $r_2$, wherein $r_1$–$r_2$–$r_3$–$r_4$ are in substantially the proportion 222–143–143–1000.

2. An infrared transmitting achromatic lens system corrected for spherical and chromatic aberrations and coma in the wavelength region of substantially 6 to 12 microns for relative apertures substantially as large as $f/1.5$ at focal lengths ranging from about 400 mm. down to about 100 mm., comprising an outwardly facing negative element of vitreous non-crystalline arsenic trisulfide glass having opposite faces of radii $r_1$ and $r_2$ in contact at the $r_2$ face with an inwardly facing positive element of silver chloride having opposite faces of radii $r_3$ and $r_4$, wherein $r_4$ is greater than $r_1$, $r_1$ is greater than $r_2$ and $r_2$ equals $r_3$, and wherein the V-number of the positive element is larger than that for the negative element.

3. An infrared transmitting achromatic lens system corrected for spherical and chromatic aberrations and coma in the wavelength region of substantially 6 to 12 microns for relative apertures substantially as large as $f/1.5$ at focal lengths ranging from about 400 mm. down to about 100 mm., comprising an outwardly facing negative element of vitreous non-crystalline infrared transmitting glass formed of a heat reaction product of arsenic with at least one element selected from the group consisting of sulfur, selenium and tellurium, said negative element having opposite faces of radii $r_1$ and $r_2$ in contact at the $r_2$ face with an inwardly facing positive element of silver chloride having opposite faces of radii $r_3$ and $r_4$, wherein $r_4$ is greater than $r_1$, $r_1$ is greater than $r_2$ and $r_3$ equals $r_3$, and wherein the V-number of the positive element is larger than that for the negative element.

References Cited in the file of this patent
UNITED STATES PATENTS

| | | |
|---|---|---|
| 442,251 | Gundlach | Dec. 9, 1890 |
| 1,536,919 | Parkinson | May 5, 1925 |
| 2,512,257 | Pfund | June 20, 1950 |
| 2,659,271 | Treuting | Nov. 17, 1953 |

OTHER REFERENCES

Use of Electrochemical By-Products in Glass Making, by Alexander Silverman, published August 1932, vol. 13, No. 8 of "The Glass Industry," pp. 129–133 relied on.

Frerichs, "New Optical Glasses Transparent in the Infrared Up to 12 $\mu$," American Physical Society, vol. 78, 1950, page 643.